(12) United States Patent
Gupta et al.

(10) Patent No.: US 9,267,028 B2
(45) Date of Patent: Feb. 23, 2016

(54) MIXTURES OF CROSSLINKING AGENTS

(75) Inventors: Ram B. Gupta, Stamford, CT (US);
Lawrence A. Flood, Norwalk, CT (US);
Urvee Y. Treasurer, Stamford, CT (US);
Barry A. Lawless, Milford, CT (US);
Colin Brogan, Stamford, CT (US)

(73) Assignee: ALLNEX IP S.À.R.L., Luxembourg (LU)

( * ) Notice: Subject to any disclaimer, the term of this patent is extended or adjusted under 35 U.S.C. 154(b) by 25 days.

(21) Appl. No.: 13/876,559

(22) PCT Filed: Sep. 23, 2011

(86) PCT No.: PCT/US2011/053020
§ 371 (c)(1),
(2), (4) Date: Mar. 28, 2013

(87) PCT Pub. No.: WO2012/044544
PCT Pub. Date: Apr. 5, 2012

(65) Prior Publication Data
US 2013/0189438 A1    Jul. 25, 2013

(30) Foreign Application Priority Data

Sep. 30, 2010  (EP) .................................... 10185094

(51) Int. Cl.
*C08G 12/36* (2006.01)
*C08F 283/06* (2006.01)
(Continued)

(52) U.S. Cl.
CPC . *C08L 61/24* (2013.01); *C08G 8/10* (2013.01); *C08G 12/10* (2013.01); *C08G 12/12* (2013.01); *C08G 12/30* (2013.01); *C08G 12/40* (2013.01);
(Continued)

(58) Field of Classification Search
CPC ....................................................... C08G 12/36
USPC .................... 528/245; 525/472, 451; 524/539
See application file for complete search history.

(56) References Cited

FOREIGN PATENT DOCUMENTS

| EP | 0 034 668 | 9/1981 |
|----|-----------|--------|
| JP | 08-269299 | * 10/1996 |

(Continued)

OTHER PUBLICATIONS

U.S. Appl. No. 13/876,556 claims in the last office action.*

(Continued)

*Primary Examiner* — Duc Truong
(74) *Attorney, Agent, or Firm* — Wenderoth, Lind & Ponack, L.L.P.

(57) ABSTRACT

The invention relates to a crosslinker composition comprising a reaction product of a cyclic urea U and a multifunctional aliphatic aldehyde A, and at least one crosslinker selected from the group consisting of reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1; reaction products of urea and/or cyclic ureas and formaldehyde; alkoxycarbonyl-aminotriazines; multifunctional isocyanates which may be partially or completely blocked; reaction products of phenols and aliphatic monoaldehydes; multifunctional epoxides; multifunctional aziridines; and multifunctional carbodiimides, wherein any of the crosslinkers which have hydroxyl groups may be etherified with one or more linear, branched, or cyclic aliphatic alcohols.

16 Claims, 1 Drawing Sheet

(51) Int. Cl.
*C08L 61/24* (2006.01)
*C08G 8/10* (2006.01)
*C08G 12/10* (2006.01)
*C08G 12/12* (2006.01)
*C08G 12/30* (2006.01)
*C08G 12/40* (2006.01)
*C08G 16/02* (2006.01)
*C08L 61/06* (2006.01)
*C08L 61/22* (2006.01)
*C08L 61/26* (2006.01)
*C08L 61/30* (2006.01)
*C08K 5/29* (2006.01)
*C08K 5/34* (2006.01)

(52) U.S. Cl.
CPC ........ *C08G 16/0256* (2013.01); *C08G 16/0268* (2013.01); *C08L 61/06* (2013.01); *C08L 61/22* (2013.01); *C08L 61/26* (2013.01); *C08L 61/30* (2013.01); *C08K 5/29* (2013.01); *C08K 5/34* (2013.01)

(56) References Cited

FOREIGN PATENT DOCUMENTS

| WO | 2004/094497 | 11/2004 |
| WO | 2007/002733 | 1/2007 |
| WO | 2007/099156 | 9/2007 |
| WO | 2009/073836 | 6/2009 |

OTHER PUBLICATIONS

International Search Report issued Nov. 8, 2011 in International (PCT) Application No. PCT/US2011/053020.

* cited by examiner

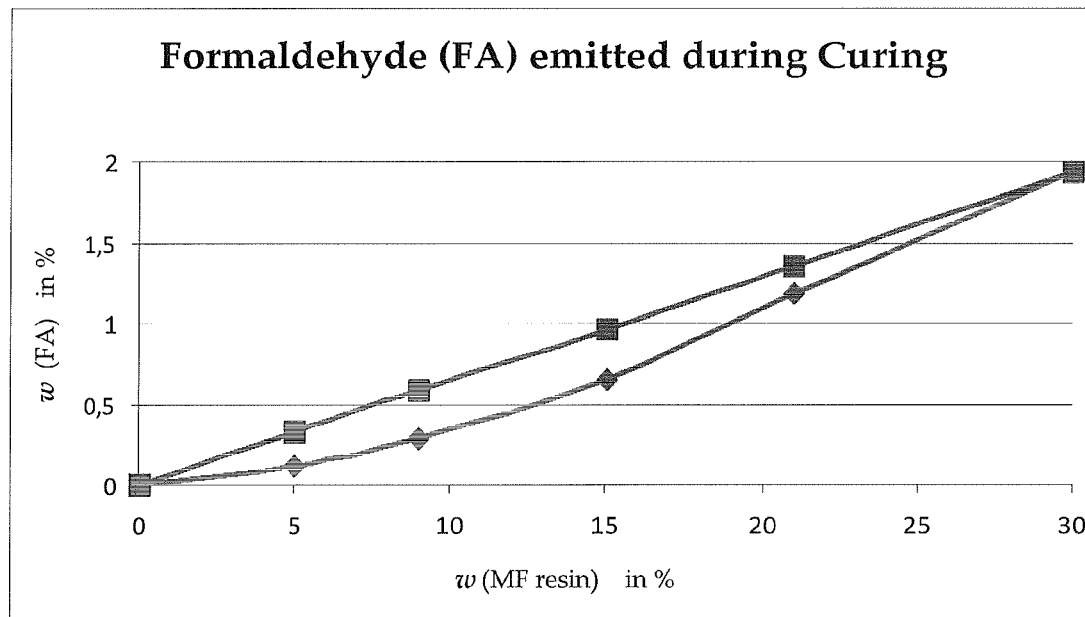

US 9,267,028 B2

MIXTURES OF CROSSLINKING AGENTS

FIELD OF THE INVENTION

This invention relates to mixtures of crosslinking agents and to curable compositions containing polyfunctional hydroxy and/or carboxyl group containing materials and the said mixtures.

BACKGROUND OF THE INVENTION

Crosslinking agents based on amino resins and coating compositions made with these are well known in the art and have been used for more than half a century in diverse applications including general industrial coatings, automotive coatings, coil coatings, powder coatings, baking enamels, and wood finishes. These crosslinking agents are based on reaction products of formaldehyde with amine or amide compounds such as melamine, guanamines, urea, and substituted ureas. Among the major drawbacks of these amino resin based coatings are formaldehyde emissions during cure.

Various crosslinking compositions have been developed that are based on combinations of aminoplast formers and aldehydes other than formaldehyde. Many of these are either less efficient or more expensive than the known formaldehyde-based systems, or are otherwise objectionable from a safety and health view. Despite the numerous efforts made, none of the crosslinker resins proposed has found wide market acceptance.

It is therefore an object of this invention to provide crosslinking compositions that have no formaldehyde emission, or a low formaldehyde emission that can be tolerated from a safety and health viewpoint, and that have application properties that are either on par with the known formaldehyde based systems, or at least provide a favourable match to these known systems.

SUMMARY OF THE INVENTION

It has been found that reaction products UA of cyclic ureas U and multifunctional aldehydes A can be used as crosslinking agents that provide good curing activity and no formaldehyde emissions.

For use as curing agents in coating compositions, there is, however, a wide range of desired properties that cannot all be realised by a limited amount of possible reactants.

It is therefore the object of this invention to provide a range of crosslinking agents that can be tailored to specific applications, and meet the required specifications. This goal has been achieved by providing mixtures of a reaction product UA of a cyclic urea U and a multifunctional aldehyde A with other crosslinkers such as those based on reaction products of amino- or amido-functional compounds, and aliphatic aldehydes, which mixtures can be chosen such that curing speed, minimum curing temperature, kind and amount of catalyst needed, and desired properties of the cured coating film can be adapted to the application field intended. It has further been found that also mixtures with certain other multifunctional compounds having two or more reactive groups selected from the group consisting of epoxy groups, acid anhydride groups, alkoxymethylaryl groups, aziridine groups, carbodiimide groups, and non-blocked and blocked isocyanate groups, provide favourable curing properties.

Mixtures of a reaction product UA of a cyclic urea U and a multifunctional aldehyde A with other crosslinkers based on reaction products of amino- or amido-functional compounds and formaldehyde lead to a level of formaldehyde evolved during curing or after curing that is reduced to a lower level than that calculated from the proportion of formaldehyde-based crosslinkers present in the mixture. This behaviour could not have been expected.

The invention therefore relates to a crosslinker composition comprising
(a) a reaction product of a cyclic urea U and a multifunctional aldehyde A,
(b) at least one crosslinker selected from the group consisting of
  (b1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1, where U is not dihydroxyethylene urea if (b) is (b1),
  (b2) reaction products of urea and/or cyclic ureas and formaldehyde,
  (b3) alkoxycarbonylaminotriazines,
  (b4) multifunctional isocyanates which may be partially or completely blocked,
  (b5) reaction products of phenols and aliphatic monoaldehydes,
  (b6) multifunctional epoxides,
  (b7) multifunctional aziridines,
  (b8) multifunctional carbodiimides,
wherein any of the crosslinkers (a) and (b) which have hydroxyl groups may be etherified with one or more linear, branched, or cyclic aliphatic alcohols.

Preferably, the reaction products UA are also partially etherified as defined hereinafter.

The invention relates also to coating compositions comprising
(a) a reaction product UA of at least one multifunctional aldehyde A with at least one cyclic urea U,
at least one crosslinker (b) selected from the group consisting of
  (b1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1,
  (b2) reaction products of urea and/or cyclic ureas and formaldehyde,
  (b3) alkoxycarbonylaminotriazines,
  (b4) multifunctional isocyanates which may be partially or completely blocked,
  (b5) reaction products of phenols and aliphatic monoaldehydes,
  (b6) multifunctional epoxides,
  (b7) multifunctional aziridines,
  (b8) multifunctional carbodiimides,
wherein any of the crosslinkers (a) and (b) which have hydroxyl groups may be etherified with one or more linear, branched, or cyclic aliphatic alcohols, and a crosslinkable resin which is an oligomeric or polymeric material having at least one kind of functional groups selected from the group consisting of hydroxyl functional groups, acid functional groups, amide functional groups, amino functional groups, imino functional groups, mercaptan functional groups, phosphine functional groups, and carbamate functional groups, which functional groups are reactive with at least one of the crosslinkers (a) and (b). The crosslinkers (b) are well known in the art.

If the crosslinker (b) is or comprises the reaction products (b1), the cyclic urea does not include dihydroxyethylene urea.

This inventions also relates to coatings produced from such coating compositions, which can be deposited on substrates which may be metal, semiconductor surfaces, plastics including composite, thermoplastic and thermoset materials, glass, ceramic, stone, concrete, plaster, wood, fabricated wood, paper, cardboard, leather, and textiles.

DETAILED DESCRIPTION OF PREFERRED EMBODIMENTS

When using, according to the invention, such mixtures of reaction products UA and at least one of the crosslinkers (b) as detailed supra, the ratio of the mass m(UA) of the reaction product UA to the mass m(b) of the crosslinker (b), or to the sum m(b tot) of the masses of all crosslinkers (b) in the mixture in the case that more than one of these crosslinkers (b) is used, is from 1/99 to 99/1, preferably from 10/90 to 90/10, and particularly preferred, from 30/70 to 70/30. The masses m as used herein always stand for the mass of the active ingredient, and not the mass of a solution containing the active ingredient, if not expressly indicated otherwise.

The multifunctional aldehyde A has the formula OHC—R'—CHO where R' may be a direct bond or a divalent radical which may preferably be a linear, branched or cyclic aliphatic radical and may have from one to twenty carbon atoms, both these options for R' leading to a divalent aldehyde having exactly two —CHO groups, or an aliphatic divalent radical which may be linear, branched or cyclic and may have from one to twenty carbon atoms, which radical carries at least one additional aldehyde group —CHO, which latter option leads to trivalent or polyvalent aldehydes having at least three aldehyde groups.

"Multifunctional" is used to denote, in the context of this invention, a molecule having more than one functional group. Preferred aldehydes are divalent aliphatic aldehydes, particularly glyoxal, malonic dialdehyde, succinic dialdehyde, and glutaric dialdehyde. Especially preferred is glyoxal. It is also possible to use mixtures of these, preferably mixtures comprising a mass fraction of at least 50% of glyoxal, particularly preferred, at least 70% of glyoxal. Glyoxal may be used for this invention in aqueous solution, as anhydrous solid which has to be cooled as its melting temperature is 15° C., or in the form of its dimer or trimer, optionally in solid hydrated form as dihydrates, or in the form of its addition products with sulphites or hydrogen sulphites which decompose under acidic conditions.

The cyclic ureas U which may be used according to the present invention have at least one unsubstituted amidic >NH group. These cyclic ureas U are cycloaliphatic or bicycloaliphatic compounds having an element of the structure —NH—CO—NH— within a ring structure, the total number of ring atoms preferably being from 5 to 7 (ethylene urea, 1,2-propylene urea, 1,3-propylene urea, 1,4-butylene urea or tetramethylene urea). Particularly preferred is ethylene urea or a mixture comprising ethylene urea, especially a mixture comprising at least a mass fraction of 50% of ethylene urea. In the case of a bicyclic compound, the simplest structure is glycoluril or acetylene diurea. Hydroxy functional ureas are not useful for the present invention.

The cyclic ureas may be substituted, preferably by alkyl groups on the N- or C-atoms, or both, the alkyl residues preferably having from one to four carbon atoms. At least one of the nitrogen atoms must remain unsubstituted to enable reaction with the aldehyde functional molecule. Preferably, the at least one cyclic urea U is selected from the group U1 consisting of ethylene urea, 1,2-propylene urea, hydantoin also known as glycolyl urea, and parabanic acid also known as oxalyl urea, and glycoluril, and from the group U2 consisting of the cyclic ureas U1 which additionally have at least one substituent $R^3$ on at least one of the nitrogen or carbon atoms of the said cyclic ureas U1, with the proviso that at least one nitrogen atom is unsubstituted, and the substituent $R^3$ is selected from the group consisting of linear, branched and cyclic alkyl groups having from 1 to 10 carbon atoms.

A particularly preferred combination is glyoxal reacted with ethylene urea, and optionally, either glyoxal, or ethylene urea, or both, in mixture with other multifunctional aldehydes and/or other cyclic ureas.

It has been found that when using purified cyclic ureas instead of commercially available qualities, e.g. commercial ethylene urea which has about 96% purity (the mass fraction of ethylene urea in one commercially available product is (96.0±0.5) %), both colour and stability of the reaction product with multifunctional aldehydes are improved. Purification can be done by the usual processes such as recrystallisation, extraction, adsorption and ion exchange reactions, distillation, or sublimation, or complexation, and preferably by melt crystallisation which latter process has the advantages of low energy consumption, high space-time yield, and consistently good quality.

It has been found that higher molar mass reaction products UA can be made by a multi-step process, where in step a), the amount of multifunctional aldehyde A added is less than 90% of the stoichiometric amount needed, preferably between 20% and 80% of the stoichiometric amount needed, and particularly preferably, between 30% and 70% of the stoichiometric amount needed, and that after step a), a further quantity of multifunctional aldehyde A is added and reacted with the reaction mixture formed in step a) wherein the total amount of multifunctional aldehyde A added is chosen such that the ratio of the amount of substance n(—CHO) of aldehyde groups in the multifunctional aldehyde A and the amount of substance n(—CO—NH) of —CO—NH-groups in the cyclic urea U is preferably from 0.2 mol/mol to 4 mol/mol, particularly preferably, 0.8 mol/mol to 1.40 mol/mol, and especially preferred, from 1.0 mol/mol to 1.30 mol/mol.

It has further been found that the reaction between the cyclic urea U and the multifunctional aliphatic aldehyde A can preferably be conducted in the presence of a solvent which does not react with either of the cyclic urea U, the multifunctional aliphatic aldehyde A, and the reaction product UA of these. The solvent may be added to the reaction mixture for the first step, or to the reaction mixture after the first step, in a multistep process. Useful solvents are aromatic compounds and mixtures thereof, such as the isomeric xylenes, mixtures thereof, also with toluene and ethyl benzene, aromatic and aliphatic esters, paraffins and mixtures thereof, aliphatic branched hydrocarbons, and linear, branched and cyclic aliphatic ethers. These solvents may also be used to remove water in an azeotropic distillation from the starting products which can be added in the form of their aqueous solutions, or of hydrates.

In a preferred variant, the mixture of cyclic urea U, multifunctional aldehyde A, and optionally, water or solvent, is concentrated before or during the reaction by removing volatile constituents by distillation, or distillation under reduced pressure.

In a preferred embodiment, the preferably at least partially etherified reaction products UA are used as component (a) in the crosslinker compositions according to the invention.

"Etherified" means here in a product of an addition reaction of an aldehyde to a cyclic urea (X being the residue of a cyclic urea which may have been reacted with a multifunctional aldehyde or may also be part of a polymer or an oligomer chain, after taking out a —CO—NH— group):

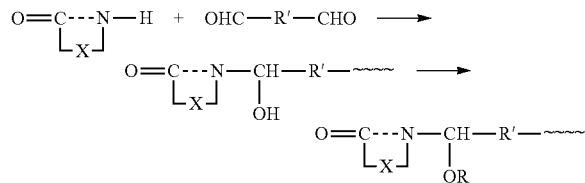

that a hydroxyl group bonded to a carbonyl carbon atom of an aldehyde molecule (denoted by bold print "C" in the formulae supra) which is generated in the addition reaction is replaced by an alkoxy group —OR. The (growing) polymer chain is denoted by "~~~~".

"Partially etherified" means here that both —OH and —OR groups bonded to carbonyl carbon atoms of the aldehyde are present in such "partially etherified" product, which at least partially etherified reaction product has as substituents on the carbonyl carbon atoms of the aldehyde A at least one kind of functional groups selected from the group consisting of hydroxyl groups —OH and alkoxy groups —OR.

The at least partially etherified reaction product of this invention has as substituents on the carbonyl carbon atoms of the aldehyde A at least one kind of functional groups selected from the group consisting of hydroxyl groups —OH and alkoxy groups —OR characterised in that the groups —OR comprise alkoxy groups —OR$^1$ and —OR$^2$, where R$^1$ and R$^2$ are both selected independently from each other from the group consisting of linear, branched or cyclic alkyl groups having from one to twelve carbon atoms, which may be interrupted by one or more of —O—, —NR"—, —S—, where R" stands for H, or an alkyl group having from one to six carbon atoms, with the proviso that not two —O— or not two —S— atoms may be immediately adjacent, where in a first embodiment, R$^1$ and R$^2$ are different from each other, and R$^2$ has at least one carbon atom more than R$^1$, or in a second embodiment, R$^1$ and R$^2$ are the same.

"Partially etherified" in the context of the present invention means preferably that the ratio of the amount of substance n(—OR) of alkoxy groups generated by etherification with alcohols of hydroxyl groups which are formed by the reaction of an aldehyde group with an n(—CO—NH) group to the sum of the amount of substance n(—OR) of said alkoxy groups and the amount of substance n(—OH) of non-etherified said hydroxyl groups is at least 0.01 mol/mol.

In the preferred case of using ethylene urea as cyclic urea, and glyoxal as multifunctional aldehyde, —R'— is a direct bond, and —X— is —NH—CH$_2$—CH$_2$—.

The aliphatic alcohols R—OH useful for the invention have at least one hydroxyl group, and from one to twelve carbon atoms, preferably one to eight carbon atoms, which may be interrupted by one or more of —O—, —NR"—, —S—, where R" stands for H, or an alkyl group having from one to six carbon atoms, with the proviso that not two —O— or not two —S— atoms may be immediately adjacent. They can be linear, branched or cyclic, preferably linear or branched, are preferably monoalcohols and preferably have from one to twelve, preferably one to eight carbon atoms, such as methanol, ethanol, n- and iso-propanol, and the isomeric butanols, particularly n-butanol, and iso-butanol, n-hexanol, or 2-ethylhexanol. Other preferred alcohols are etheralcohols of the formula R$^3$—(O—C$_n$H$_{2n}$)$_m$—OH where R$^3$ is an alkyl group having preferably from one to four carbon atoms, n is an integer of from 2 to 4, and m is an integer of from 1 to 10, such as ethylene glycol monomethylether, ethylene glycol monobutylether, triethylene glycol monoethylether, or dipropyleneglycol monomethylether. Among the cyclic aliphatic alcohols, cyclohexanol is preferred. A small amount, i.e. up to a mass fraction of 10% of the aliphatic alcohols used, may be difunctional or polyfunctional (having a functionality of three or more).

At least two different such alcohols R$^1$—OH and R$^2$—OH have to be used to prepare an at least partially etherified reaction product UA of cyclic ureas U and multifunctional aldehydes A according to the first embodiment of the invention, the molar ratio n(R$^1$—OH)/n(R$^2$—OH) of these being from 1 mol/99 mol to 99 mol/1 mol, preferably from 10 mol/90 mol to 90 mol/10 mol, and particularly preferably from 25 mol/75 mol to 75 mol/25 mol. The aliphatic alcohol R$^2$—OH has at least one carbon atom in its molecule more that there is in R$^1$—OH. In a preferred embodiment, methanol is used as R$^1$OH, where R$^2$—OH may be ethanol, or a higher homologue thereof having up to twelve carbon atoms, including branched and cyclic aliphatic monoalcohols. Preferred as R$^2$—OH are ethanol, n- and iso-propanol, n-butanol, sec.-butanol, iso-butanol, n-pentanol, 2- and 3-methyl-1-butanol, n-hexanol, n-octanol, 2-ethyl-1-hexanol, 1-decanol, 1-dodecanol, and mixtures of these, as well as ether alcohols such as ethylene glycol monomethylether, ethylene glycol monobutylether, triethylene glycol monoethylether, or dipropyleneglycol monomethylether. If methanol is used as R$^1$OH, the molar ratio n(R$^1$—OH)/n(R$^2$—OH) of these are especially preferably from 15 mol/85 mol to 45 mol/55 mol, preferably from 20 mol/80 mol to 40 mol/60 mol. It is further preferred that the alcohol R$^1$—OH is significantly water-miscible, meaning that mixtures of water and R$^1$—OH form homogeneous mixed phases. It is further preferred that the alcohol R$^1$—OH is significantly water-miscible and that the alcohol R$^2$—OH has at most limited solubility in water, limited solubility meaning that the aqueous phase does not contain a mass fraction of more than 30% of the alcohol R$^2$—OH. In this embodiment wherein R$^1$ and R$^2$ are different from each other, R$^2$ has at least one carbon atom more than R$^1$, and the ratio of the number of —OR groups to the sum of the number of —OH groups and the number of —OR groups which are substituents on the carbonyl carbon atoms of the aldehyde A in the reaction product UA is more than 60%, the number of —OR groups being the sum of the number of —OR$^1$ groups and the number of —OR$^2$ groups.

It is further preferred that the degree of etherification of the reaction product UA, measured as the ratio n(RO—)/n(U) of the amount of substance n(RO—) of alkoxy groups to the amount of substance n(U) of cyclic urea U chemically bound in the reaction products, is at least 1.1 mol/mol.

It is further preferred that the reaction product UA has a ratio of the amount of substance of residual >NH groups to the amount of substance of moieties derived from the cyclic urea U of not more than 0.2 mol/mol.

In the process according to the invention, the following additional preferred measures may be realised, singly, or in any combination:
the multifunctional aldehyde A is charged first,
the cyclic urea U is charged first,
water may be added to the multifunctional aldehyde A, or to the cyclic urea U, or to their mixture
the pH of the mixture of the multifunctional aldehyde A and the cyclic urea U may be adjusted to from 5.0 to 8.0, preferably from 5.5 to 7.5, and particularly preferably, from 6.2 to 6.8, the mixture of the cyclic urea U and the multifunctional aldehyde may be heated to from ambient to less than 80° C., preferably, to between 35° C. and 50° C., the mass of cyclic urea U and the mass of aldehyde A present in the reaction mixture are preferably chosen such that the following condition is met for ratio of the amount of substance n (—CHO) of aldehyde groups in the multifunctional aldehyde, and, in the case of mixtures of aldehydes, and the amount of substance of —CO—NH— groups in the cyclic urea U:

0.8 mol/mol≤n(—CHO)/n(—CO—NH—)≤1.40 mol/mol and particularly preferably, 1.0 mol/mol≤n(—CHO)/n(—CO—NH—)≤1.30 mol/mol, the aliphatic alcohol $R^1$—OH is added preferably in an amount such that the ratio of the amount of substance of alcohol $R^1$—OH, n($R^1$—OH) to the amount of substance of aldehyde groups in the multifunctional aldehyde A is from 0.6 mol/mol to 20 mol/mol, a second alcohol $R^2$—OH is added after an etherification stage where alcohol $R^1$—OH has been used, the pH during the etherification or alkylation reaction is preferably below 5, particularly preferably to below 3.0, etherification is preferably effected between 25° C. and 100° C., most preferably, between 40° C. and 45° C., water formed during etherification, and the unreacted alcohol are removed during or after the etherification, preferably by distillation under reduced pressure, and further preferably, at a temperature between 50° C. and 80° C.

if water and alcohol are removed during etherification, the alcohol is preferably recycled after reaction and optional removal of unreacted alcohol and of water, the reaction mixture is preferably cooled to obtain a solution of an at least partially etherified reaction product of an aliphatic multifunctional aldehyde A and a cyclic urea U, and the ratio of the amount of substance n (—O—$R^2$) of alkoxy groups —O—$R^2$ to the amount of substance n (—O—$R^1$) of alkoxy groups —O—$R^1$ in the etherified product of this process is between 0.11 mol/mol and 20 mol/mol.

Particularly good results have been obtained when combining two or more of these preferred embodiments.

A preferred process to make the reaction product UA wherein $R^1$ and $R^2$ are different comprises the following steps
a) mixing a multifunctional aldehyde A with a cyclic urea U to effect an addition reaction, and optionally, removing water,
b) adding an aliphatic alcohol $R^1$—OH, and etherifying under acid conditions
c) adding a further aliphatic alcohol $R^2$—OH which has at least one carbon atom in its molecule more that there is in $R^1$—OH, and etherifying under acid conditions,
wherein either or both of steps b) and c) may be repeated one or more times.

A further preferred process to make the reaction product UA wherein $R^1$ and $R^2$ are the same comprises the following steps
a) mixing a multifunctional aldehyde A with a cyclic urea U to effect an addition reaction, and optionally, removing water,
b) adding an aliphatic alcohol $R^1$—OH, and etherifying under acid conditions
c) adding a further quantity of the aliphatic alcohol $R^1$—OH and etherifying under acid conditions,
where step c) may be done once, or may be repeated to be done at least twice.

Repetition of an etherification step, i.e. addition of alcohol and further etherification after optional removal of water and unreacted alcohol, has been found to increase the degree of etherification. This repetition is particularly preferable in the case of only one alcohol being used for etherification. Double or triple or multiple etherification, the number of repetitions being selected to reach the desired degree of etherification, is therefore a preferred method.

In a preferred variant, after an etherification step, at least a part of the unreacted alcohol and optionally, at least a part of the water present, and further optionally, at least a part of the at least one solvent that has no reactive groups which react with aldehyde groups, n(—CO—NH) groups, or hydroxyl groups, is removed by azeotropic distillation wherein a solvent is added that is immiscible with water in a way that it forms a phase separate from an aqueous phase containing at least a part of the water separated by distillation, wherein the phase different from the aqueous phase is recycled to the distillation still, or back to the reactor.

If a solid precipitate or a suspended solid is formed during the reaction, this solid matter is preferably separated by any of the usual processes such as centrifugation, or filtration.

It has further been found that the reaction between the cyclic urea U and the multifunctional aliphatic aldehyde A can preferably be conducted in the presence of a solvent which does not react with either of the cyclic urea U, the multifunctional aliphatic aldehyde A, and the reaction product UA of these. Useful solvents are aromatic compounds and mixtures thereof, such as the isomeric xylenes, mixtures thereof, also with toluene and ethyl benzene, aromatic and aliphatic esters, paraffins and mixtures thereof, aliphatic branched hydrocarbons, and linear, branched and cyclic aliphatic ethers. These solvents may also be used to remove water in an azeotropic distillation from the starting products which can be added in the form of their aqueous solutions, or of hydrates.

The reaction products thus obtained can be combined as crosslinker composition both with solvent borne and with water borne binder resins having active hydrogen functionality (hydroxyl or carboxylic acid groups), in combination with the crosslinkers mentioned as (b1) through (b8).

These additional crosslinkers (b1) through (b8) are well known in the art, and have been described fully in the pertinent literature. See Ullmann's Encyclopedia of Industrial Chemistry, Weinheim 1991, Vol. A18, "Paints and Coatings", pp. 359 to 544, and references therein.

Particularly preferred are crosslinker compositions comprising
(a) a reaction product of a cyclic urea U and a multifunctional aliphatic aldehyde A, and
(b) at least two crosslinkers selected from the group consisting of
(b1) reaction products of an aminotriazine and at least one aldehyde selected from the group consisting of aliphatic monoaldehydes and multifunctional aliphatic aldehydes having the structure Y(CHO)$_n$ where Y is an n-functional aliphatic residue, and n is greater than 1,
(b2) reaction products of urea and/or cyclic ureas and aliphatic aldehydes,
(b3) alkoxycarbonylaminotriazines.

When methanol or ethanol, alone or in combination, are used as etherifying alcohol, for the reaction products UA, and optionally, also for those of the crosslinkers (b) that have hydroxyl groups, the resulting crosslinker compositions are particularly useful in combination with water-borne crosslinkable resins. Use of higher alcohols such as propanol or butanol makes the crosslinker composition more compatible with solvent-borne crosslinkable resins. It was found that the crosslinker compositions prepared according to the invention have a higher reactivity and can be used when appropriately catalysed, for curing even at room temperature, and that the appearance of the cured films is also favourable for the crosslinkers according to the present invention, in yellowness and gloss and haziness.

In a preferred variant, the crosslinkable composition comprises an oligomeric or polymeric material the functional groups of which are hydroxyl groups, and the polymeric or oligomeric material is selected from the group consisting of acrylic resins, polyester resins, alkyd resins, polyurethane resins, epoxy resins, vinyl resins, polyether polyols, characterised in that the polymeric or oligomeric material has a hydroxyl number of from 5 mg/g to 300 mg/g.

In a further preferred variant, the crosslinkable composition comprises an oligomeric or polymeric material the functional groups of which are carboxyl groups, and the oligomeric or polymeric material is selected from the group consisting of acrylic resins, polyester resins, alkyd resins, polyurethane resins, epoxy ester resins, vinyl resins, rosin, and maleinate resins, characterised in that the oligomeric or polymeric material has an acid number of from 5 mg/g to 300 mg/g.

Suitable active hydrogen-containing materials include, for example, polyfunctional hydroxy group containing materials such as polyols, hydroxyfunctional acrylic resins having pendant or terminal hydroxy functionalities, hydroxyfunctional polyester resins having pendant or terminal hydroxy functionalities, hydroxyfunctional polyurethane prepolymers, products derived from the reaction of epoxy compounds with an amine, and mixtures thereof. Acrylic and polyester resins are preferred. Examples of the polyfunctional hydroxy group containing materials include commercially available materials such as DURAMAC® 203-1385 alkyd resin (Eastman Chemical Co.); Beckosol® 12035 alkyd resin (Reichhold Chemical Co.), JONCRYL® 500 acrylic resin (S. C. Johnson & Sons, Racine, Wis.); AT-400 acrylic resin (Rohm & Haas, Philadelphia, Pa.); CARGILL® 3000 and 5776 polyester resins (Cargill, Minneapolis, Minn.); K-FLEX® XM-2302 and XM-2306 resins (King Industries, Norwalk, Conn.); CHEMPOL® 11-1369 resin (Cook Composites and Polymers, Port Washington, Wis.); CRYLCOAT® 3494 solid hydroxy terminated polyester resin (Cytec Industries Inc., Woodland Park, N.J.); RUCOTE® 101 polyester resin (Ruco Polymer, Hicksville, N.Y.); JONCRYL® SCX-800-A and SCX-800-B hydroxyfunctional solid acrylic resins (S. C. Johnson & Sons, Racine, Wis.).

Examples of carboxyfunctional resins include CRYLCOAT® solid carboxy terminated polyester resin (Cytec Industries Inc., Woodland Park, N.J.). Suitable resins containing amino, amido, carbamate or mercaptan groups, including groups convertible thereto, are in general well-known to those of ordinary skill in the art and may be prepared by known methods including copolymerising a suitably functionalised monomer with a comonomer capable of copolymerising therewith.

In a further preferred variant, the crosslinkable composition comprises an oligomeric or polymeric material the functional groups of which are amino groups, and the oligomeric or polymeric material is selected from the group consisting of acrylic resins, polyurethane resins, epoxy amine adducts, and vinyl resins, characterised in that the oligomeric or polymeric material has an amine number of from 5 mg/g to 300 mg/g.

In a further preferred variant, the crosslinkable composition comprises an oligomeric or polymeric material the functional groups of which are carbamate functional groups, and the polymeric material is selected from the group consisting of acrylic resins, polyurethane resins, epoxy amine adducts, and vinyl resins, characterised in that the polymeric material has a specific amount of substance of carbamate groups of from 0.1 mmol/g to 6 mmol/g.

In a further preferred variant, the crosslinkable composition comprises an oligomeric or polymeric material which is present as an aqueous dispersion.

In a further preferred variant, the crosslinkable composition comprises an oligomeric or polymeric material which is present as a solution in a non-aqueous solvent.

In a further preferred variant, the crosslinkable composition comprises an oligomeric or polymeric material which is present as a particulate solid having a melting temperature in excess of 35° C.

In a further preferred variant, the crosslinker composition is such that the activation temperature of crosslinker (a) and the activation temperature of crosslinker (b) differ by at least 10 K, preferably by at least 20 K, and particularly preferred, by at least 30 K, where the activation temperature of crosslinker (a) is lower than the activation temperature of crosslinker (b). For practical considerations, activation temperature is defined here as the temperature at which a standard alkyd resin, in this case Beckosol® 12-035, is cured in the presence of the appropriate catalyst with the crosslinker under consideration in a ratio of the mass of (undiluted) binder resin to mass of (undiluted) crosslinker of 7:3 to give a resistance to MEK double rubs as further detailed infra, of at least 20 after a specified curing time.

Further preferred objects of this invention are described in the claims.

Coating compositions are prepared by admixing the mixture comprising the reaction product UA and at least one of the crosslinkers (b) to a polymeric binder resin having active hydrogen atoms, i.e. at least one of hydroxyl groups, acid groups, preferably carboxyl groups, carbamate groups, amide groups, imide groups, amino groups, imino groups, mercaptan groups, or phosphine groups. The resulting mixture is homogenised, and applied to a substrate by spraying, brushing, wire coating, curtain coating, blade coating, roll coating, dipping, electrophoretic deposition, powder spraying, or electrostatic spraying.

The ratio of mass of solid binder resin to the sum of the mass of the reaction product UA and additional crosslinker (b) is preferably from 99/1 to 50/50, particularly preferably from 95/5 to 60/40, and most preferred, from 90/10 to 70/30.

When using such mixtures of reaction products UA and at least one of the crosslinkers (b) as detailed supra, the ratio of the mass m(UA) of the reaction product UA to the mass m(b) of the crosslinker (b), or to the sum m(b tot) of the masses of all crosslinkers (b) in the mixture in the case that more than one of these crosslinkers (b) is used, is from 1/99 to 99/1, preferably from 10/90 to 90/10, and particularly preferred, from 30/70 to 70/30. The masses m as used herein always stand for the mass of the active ingredient, and not the mass of a solution containing the active ingredient, if not expressly indicated otherwise.

It has been verified that the crosslinker compositions according to the invention can be combined with solvent borne or water borne binder resins having active hydrogen atoms (these resins collectively also referred to hereinafter as "active hydrogen material") which are preferably hydrogen atoms in hydroxy or carboxylic acid functionality, or both, particularly with hydroxy or carboxylic acid functional alkyd resin, hydroxy or carboxylic acid functional acrylic resins, hydroxy functional polyurethane resins, and hydroxy functional epoxy resins, to generate a curable composition which can be used as constituent for a coating composition.

As these crosslinker compositions when adequately catalysed are active already at ambient temperature (20° C. to 25° C.), they are particularly useful to cure coatings on heat sensitive substrates, such as paper, cardboard, textiles, leather, wood, fabricated wood, and also plastics including composite materials, thermoplastics, and thermosets. They also work, of course, as crosslinkers for coating compositions that are used on substrates such as metals, semiconductor surfaces, ceramics, stone, plaster, glass, and concrete which allow higher curing temperatures. Application of said crosslinker composition in combination with the binder resins mentioned supra together with an appropriate catalyst can also be considered where cure temperature or energy savings are an issue.

Suitable catalysts are preferably acid catalysts, particularly those selected from the group consisting of organic sulphonic acids, organic phosphonic acids, organic sulphonimides, and Lewis acids, or salts or complexes of Lewis acids such as amine salts or ether complexes. Useful catalysts are para-toluene sulphonic acid (pTSA), dodecylbenzene sulphonic (DDBSA), dinonylnaphthalene sulphonic acid (DNNSA), and dinonyl naphthalene disulphonic acid (DNNDSA), which may also be blocked with volatile amines. Particularly preferred are N-methylsulphonyl-p-toluenesulphonamide (MTSI), para-toluene sulphonic acid (pTSA), dodecylbenzene sulphonic (DDBSA), dinonylnaphthalene sulphonic acid (DNNSA), and dinonyl naphthalene disulphonic acid (DNNDSA). Blocked acid catalysts where the acid is liberated e.g. by heating can, of course, also be used, such as acid esters or reaction products of acids and epoxide functional compounds. Particularly useful catalysts are acid catalysts, such as toluene sulphonic acid, or dinonyl naphthalene disulphonic acid, which are usually dissolved in alcohol.

Usual additives such as organic solvents, coalescing agents, defoamers, levelling agents, fillers, pigments, light stabilisers, pigments, flow control agents, sag control agents, antiskinning agents, antisettling agents, adhesion promoters, wetting agents, preservatives, plasticisers, mould release agents, and corrosion inhibitors can, of course, be used in coating compositions comprising the crosslinker compositions of the present invention.

The crosslinker compositions of this invention may be applied as such to substrates selected from the group consisting of paper, textiles, wood, fabricated wood, leather, or cellulosic materials, for which purpose they may be mixed with at least one of catalysts, fillers, wetting agents, solvents, and diluents, and applied to the substrate.

The curable compositions of this invention may preferably be employed as coatings in the general areas of coatings such as original equipment manufacturing (OEM) including automotive coatings, general industrial coatings including industrial maintenance coatings, architectural coatings, agricultural and construction equipment coatings (ACE), powder coatings, coil coatings, can coatings, wood coatings, and low temperature cure automotive refinish coatings. They are usable as coatings for wire, appliances, automotive parts, furniture, pipes, machinery, and the like. They can also be used in electronic applications, including coatings for metallised circuit boards, semiconductor surfaces, displays, and packaging for electronic circuitry.

The coating compositions can be applied by any of the known techniques such as spraying, dipping, brushing, wire coating, curtain coating, and using a doctor blade. If formulated as solids, they may also be used as crosslinkers in powder coating compositions, and may be applied by the usual methods such as electrostatic spraying, or powder spraying.

One particular and unexpected advantage of the crosslinker compositions according to the present invention is the fact that, depending on the mass fractions of components (a) and (b) in the crosslinker mixture allow for a two stage cure wherein early development of hardness and dryness to dust or touch is observed which allows to handle coated substrates after curing either at room temperature (between 20° C. and 25° C.) for less than 24 h or at slightly elevated temperature below 50° C. after less than three hours. The coated substrates may then be transported to a large volume oven where the final film properties such as hardness are procured by heating to the activation temperature needed for component (b) of the crosslinker mixture, wherein these large volume ovens are preferably equipped with off-gas incineration or absorption equipment. This dual cure method allows for the coated parts to be handled, stored for future use or post-formed before the final cure is administered.

When the reaction products UA of cyclic ureas U and multifunctional aliphatic aldehydes A are combined with crosslinkers based on reaction products of formaldehyde and amino or amido or urethane compounds such as aromatic amines, melamine, other aminotriazines, urea and substituted ureas, carbonamides, sulphonamides, cyanamides, and guanidines, it has been found, unexpectedly, that the formaldehyde emission for such systems is less that expected from the ratio of masses of crosslinkers according to (a) and crosslinkers according to (b) of the present mixture. This finding is particularly important for combinations of melamine-formaldehyde resins and urea-formaldehyde resins which have found the largest acceptance as crosslinkers for coating compositions, as this enables the paint manufacturer to keep the favourable crosslinking properties of these said aminoplast resins while at the same time reducing the amount of formaldehyde split off during curing.

The crosslinker compositions of this invention can therefore be advantageously used for such applications where formaldehyde emission during the curing step, and during storage or use of parts coated with coating compositions comprising the said crosslinkers is limited.

EXAMPLES

The following examples illustrate the invention, without intending to limit. All concentrations (strengths) and ratios stated in "%" are mass fractions (ratio of the mass $m_B$ of a specific substance B, divided by the mass in of the mixture, in the case of a concentration, or by the mass $m_D$ of the second substance D, in the case of a ratio). The acid number is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g". The hydroxyl number is defined according to DIN EN ISO 4629 (DIN 53 240) as the ratio of the mass of potassium hydroxide $m_{KOH}$ having the same number of hydroxyl groups as the sample, and the mass $m_B$ of that sample (mass of solids in the sample for solutions or dispersions); the customary unit is "mg/g". Dynamic viscosities were measured on the Gardner-Holt scale and converted to SI units (mPa·s). GO stands for glyoxal, and EU for ethylene urea. n is the symbol for the physical quantity "amount of substance" with the SI unit "mol". M is the symbol for the physical quantity "molar mass" with the SI unit "kg/mol".

$^{13}$C-NMR analyses have been done with a Bruker-Oxford Avance II 400 NMR spectrometer with a 100 mm probe. Samples were prepared by diluting the reaction products with approximately the same mass of dimethyl sulphoxide-d$_6$.

Measurement of molar mass of the reaction products UA was done by HPSEC, or gel permeation chromatography, using tetrahydrofuran as solvent, at a sample concentration of 1 g/100 ml, a flow of 1.0 ml/min, a column temperature of 40° C., and refractometric detection, using a set of crosslinked polystyrene bead filled columns having a particle diameter of 5 im, with pore sizes of 100 nm (1×), 50 nm (2×), and 10 nm (3×), providing a measuring range of from 100 g/mol to 50 kg/mol, for calibration with polystyrene standards. Data collection and analysis was made with a software provided by Polymer Standards Service WinGPC system.

Example 1

Preparation of a Crosslinker Based on Addition Products of Ethylene Urea and Glyoxal A crosslinker resin based on addition products of ethylene urea and glyoxal was prepared by the following procedure:

363 g (2.6 mol) of an aqueous solution of glyoxal (ethane dial, with a mass fraction of solute of 40%) were charged to a reaction vessel under a nitrogen purge and the pH was adjusted to 6.2 by addition of aqueous sodium bicarbonate solution with a mass fraction of solids of 10%. 207 g (2.18 mol) of ethylene urea (2-imidazolidinone hemihydrate, solid) were added and the resulting mixture was heated to a temperature of between 40° C. and 45° C. and held for three hours under stirring. At the end of three hours, 464 g (14.5 mol) of methanol were added. The pH was adjusted to about 2.5 with aqueous sulphuric acid (with a mass fraction of solute of 25%) and the reaction temperature was then raised and maintained at (48±3)° C. for three hours. At the end of three hours of methylation, 998 g (13.5 mol) of 1-butanol were added and pH was readjusted to about 2.5 with aqueous sulphuric acid as supra. The reaction temperature was again maintained at (48±3)° C. for one hour and then, excess methanol and butanol were removed slowly under reduced pressure (25.333 kPa slowly linearly decreased to 16 kPa, equivalent to 190 mm Hg ramped to 120 mm Hg) until a mass fraction of approximately from 36% to 40% of the total reaction mass had been removed. The remaining reaction mixture was then cooled to approximately 35° C. and the pH of the reaction mixture was then adjusted to approximately 6.5 with aqueous sodium hydroxide solution having a mass fraction of solids of 25%. The reaction temperature was then raised to (55±5)° C. and removal of excess methanol and butanol was continued under reduced pressure (16 kPa slowly linearly decreased to 6.7 kPa, equivalent to 120 mm Hg ramped to 50 mm Hg) until a dynamic viscosity of approximately 300 mPa·s and a mass fraction of solids of 61.4% were obtained.

The degree of etherification of the resulting straw yellow crosslinker solution (814 g) was determined by $^{13}$C-NMR analysis as n(—O-Alkyl)/n(EU)=1.92 mol/mol; "EU" stands for ethylene urea, its molar mass was determined by HPSEC as M$_w$=1553 g/mol, where M$_w$ stands for the weight average molar mass. The fraction of the area in the graph of refraction number difference versus elution volume commonly provided in a high performance size exclusion analysis, which is also referred to as gel permeation chromatography, of the low molar mass range, viz., below a molar mass of 1 kg/mol, was 34.1%. The Hazen Colour (determined in accordance with DIN-ISO 6271) was 383. The ratio of the amount of substance n(—O-Bu) of n-butoxy groups to the amount of substance n(—O-Me) of methoxy groups in the reaction products was 2.7 mol/mol.

Example 2

Coating Compositions with Mixed Crosslinkers

Clear film-forming compositions were prepared by mixing together the following ingredients. A commercial alkyd resin based on coconut oil (Beckosol® 12-035 having a mass fraction of solids of 60% dissolved in xylene, a hydroxyl number of 155 mg/g and an acid number of 12 mg/g) was used as binder resin. In the paints, the amount of solvent added was chosen to provide a coating formulation with a mass fraction of solids of 45%, the ratio of the mass of solids in the alkyd resin binder to the mass of solids in the crosslinkers was always of 70/30.

Paint 2.1 was prepared as follows:

14.2 g of butyl acetate, 0.9 g of methoxypropanol and 9.0 g of n-butanol were added to 52.5 g of the alkyd resin mentioned supra and mixed. 2.2 g of a 40% strength solution of para-toluene sulphonic acid in iso-propanol were then added and mixed into the diluted alkyd resin. 19.8 g of the etherified crosslinker of example 1 was added to the alkyd solution. Finally, 1.4 g of a butylated melamine formaldehyde resin crosslinker (CYMEL® MB-94 resin, mass fraction of solids: 96%) were added to the formulation and mixed. The ratio of the mass of solids in the etherified crosslinker of example 1 to the mass of solids in the butylated melamine formaldehyde resin crosslinker was 9:1.

Paint 2.2 was prepared in the same way as Paint 2.1, but in this case, 17.4 g of butyl acetate, 11.0 g of the crosslinker of Example 1, and 7.0 g of the butylated melamine formaldehyde resin crosslinker were employed. The ratio of the mass of solids in the etherified crosslinker of example 1 to the mass of solids in the butylated melamine formaldehyde resin crosslinker was 1:1.

Paint 2.3 was prepared in the same way as Paint 2.1, but in this case, 20.5 g of butyl acetate, 2.2 g of the crosslinker of Example 1, and 12.7 g of the butylated melamine formaldehyde resin crosslinker were employed. The ratio of the mass of solids in the etherified crosslinker of example 1 to the mass of solids in the butylated melamine formaldehyde resin crosslinker was 1:9.

Paint 2.4 was prepared in the same way as Paint 2.1, but in this case, 13.2 g of butyl acetate, 11.0 g of the crosslinker of Example 1, and 11.2 g of a butylated urea formaldehyde crosslinker resin (CYMEL® U-216-10 LF resin, mass fraction of solids 60%) were employed. The ratio of the mass of solids in the etherified crosslinker of example 1 to the mass of solids in the butylated urea formaldehyde resin crosslinker was 1:1.

Paint 2.5 was prepared in the same way as Paint 2.1, but in this case, 17.7 g of butyl acetate, 11.0 g of the crosslinker of Example 1, and 11.2 g of a methylated-ethylated benzoguanamine formaldehyde resin (CYMEL® 1123 resin, mass fraction of solids 100%) were employed. The ratio of the mass of solids in the etherified crosslinker of example 1 to the mass of solids in the methylated-ethylated benzoguanamine formaldehyde resin crosslinker was 1:1.

Paint 2.6 was prepared in the same way as Paint 2.1, but in this case, 10.9 g of butyl acetate, 11.0 g of the crosslinker of Example 1, and 13.5 g of a tris-alkylcarbonylamino triazine crosslinker (CYLINK® 2000 resin, mass fraction of solids 50%) were employed. The ratio of the mass of solids in the etherified crosslinker of example 1 to the mass of solids in the tris-alkylcarbonylamino triazine crosslinker was 1:1.

Paint 2.7 was prepared in the same way as Paint 2.1, but in this case, 13.4 g of butyl acetate, 11.0 g of the crosslinker of Example 1, and 11.3 g of the crosslinker of example 1B of WO 2004/094 498 were employed. The ratio of the mass of solids in the etherified crosslinker of example 1 to the mass of solids in the crosslinker of example 1B of WO 2004/094 498 was 1:1.

Paint 2.8 was prepared in the same way as Paint 2.1, but in this case, 17.4 g of butyl acetate, 11.0 g of the crosslinker of Example 1, and 7.0 g of a butylated glycoluril formaldehyde crosslinker resin (CYMEL® 1170 resin, mass fraction of solids 96%) was employed. The ratio of the mass of solids in the etherified crosslinker of example 1 to the mass of solids in the butylated glycoluril formaldehyde resin crosslinker was 1:1.

Paint 2.9 was prepared in the same way as Paint 2.1, but in this case, 14.8 g of butyl acetate, 11.0 g of the crosslinker of Example 1, and 9.6 g of a blocked isocyanate (Trixene® BI 7982, Baxenden Chemicals, trimer of hexamethylene diisocyanate, blocked with 3,5-dimethyl pyrazole, mass fraction of solids 70%) was employed. The ratio of the mass of solids in the etherified crosslinker of example 1 to the mass of solids in the blocked isocyanate crosslinker was 1:1.

Paint 2.10 was prepared in the same way as Paint 2.1, but in this case, 17.7 g of butyl acetate, 11.0 g of the crosslinker of Example 1, and 6.8 g of a water-dispersible epoxy resin (®Beckopox EP 147w, mass fraction of solids 100%; specific amount of epoxide groups 5.1 mol/kg and a dynamic viscosity of 11 Pa·s at 23° C. and 100 s$^{-1}$) was employed. The ratio of the mass of solids in the etherified crosslinker of example 1 to the mass of solids in the epoxy resin crosslinker was 1:1.

Paint 2.11 was prepared in the same way as Paint 2.1, but in this case, 16.0 g of butyl acetate, 11.0 g of the crosslinker of Example 1, and 8.4 g of a phenol formaldehyde crosslinker resin (®Phenodur PR-612/80B, mass fraction of solids 80%) was employed. The ratio of the mass of solids in the etherified crosslinker of example 1 to the mass of solids in the phenol formaldehyde resin crosslinker was 1:1.

Paint 2.12 was prepared in the same way as Paint 2.1, but in this case, 16.5 g of butyl acetate, 11.0 g of the crosslinker of Example 1, and 7.8 g of a carboxy-functional methylated-ethylated benzoguanamine formaldehyde crosslinker resin (CYMEL® 1125 resin, mass fraction of solids 85%) were employed. The ratio of the mass of solids in the etherified crosslinker of example 1 to the mass of solids in the methylated-ethylated benzoguanamine formaldehyde resin crosslinker was 1:1.

A further paint 2.13 was prepared in the same way as Paint 2.1, but in this case, 13.4 g of butyl acetate and 22.0 g of the crosslinker of Example 1 were employed without addition of a further crosslinker.

The paints were applied onto a 101.6 mm×304.8 mm (4"×12") iron-phosphated steel panel using a #40 wire-wound coating bar to drawdown the applied formulation resulting in a uniform film. The coated panels were then allowed to flash at room temperature for ten minutes. They were then allowed to cure either twenty-four hours at ambient conditions (room temperature of 20° C.), or were cured for fifteen minutes at 65° C., or for twenty minutes at 120° C., and measured 24 hours later. The following properties were determined on the coated samples:

Hardness Hardness was measured with a BYK Gardner Pendulum Hardness Tester-as König hardness according to ASTM D 4366-95

MEK Resistance was determined as number of double rubs according to ASTM D 4572 to mar and to failure (more than 50% of the coating film removed), the test was stopped at 200 double rubs The following results were obtained:

TABLE 1

Cured Paint Film Properties (Curing Conditions: temperature; time)

| Paint | 2.1 | 2.2 | 2.3 | 2.4 | 2.5 | 2.6 | 2.7 | 2.8 | 2.9 | 2.10 | 2.11 | 2.12 | 2.13 |
|---|---|---|---|---|---|---|---|---|---|---|---|---|---|
| 20° C.; 24 h | | | | | | | | | | | | | |
| Dry Film Thickness in mil (0.001 in) im μm | 1.5 38.1 | 1.5 38.1 | 1.3 33.0 | 1.5 38.1 | 1.4 35.6 | 1.4 35.6 | 1.4 35.6 | 1.4 35.6 | 1.5 38.1 | (2) | 1.5 38.1 | 1.5 38.1 | 1.5 38.1 |
| König Hardness in s | 60 | 45 | 23 | 48 | 21 | 31 | 50 | 58 | 29 | (2) | 40 | 27 | 112 |
| MEK DR to fail (1) | 30 | 35 | 10 | 25 | 25 | 10 | 10 | 20 | 20 | 5 | 20 | 11 | 35 |
| 65° C.; 15 min | | | | | | | | | | | | | |
| Dry Film Thickness in mil (0.001 in) im μm | 1.5 38.1 | 1.5 38.1 | 1.4 35.6 | 1.5 38.1 | 1.5 38.1 | 1.4 35.6 | 1.4 35.6 | 1.4 35.6 | 1.5 38.1 | 1.1 27.9 | 1.5 38.1 | 1.5 38.1 | 1.5 38.1 |
| König Hardness in s | 91 | 68 | 62 | 82 | 49 | 36 | 72 | 141 | 37 | (3) | 63 | 59 | 123 |
| MEK DR to fail | 50 | 70 | 50 | 65 | 25 | 5 | 15 | 55 | 20 | 5 | 25 | 25 | 200 |
| 120° C.; 20 min | | | | | | | | | | | | | |
| Dry Film Thickness in mil (0.001 in) im μm | 1.5 38.1 | 1.4 35.6 | 1.3 33.0 | 1.3 33.0 | 1.4 35.6 | 1.3 33.0 | 1.4 35.6 | 1.2 30.5 | 1.3 33.0 | 1.3 33.0 | 1.3 33.0 | 1.4 35.6 | |
| König Hardness in s | 165 | 164 | 161 | 168 | 174 | 180 | 79 | 188 | 156 | 26 | 191 | 152 | |
| HK25 in kp/mm$^2$ | 9.6 | 10.1 | 9.6 | 10.6 | 10.7 | 10.7 | 3.2 | 15.6 | 10.7 | 0.6 | 15.6 | 12.1 | |

TABLE 1-continued

Cured Paint Film Properties (Curing Conditions: temperature; time)

| | Paint | | | | | | | | | | | | |
|---|---|---|---|---|---|---|---|---|---|---|---|---|---|
| | 2.1 | 2.2 | 2.3 | 2.4 | 2.5 | 2.6 | 2.7 | 2.8 | 2.9 | 2.10 | 2.11 | 2.12 | 2.13 |
| HK25 in MPa | 94.1 | 99.1 | 94.1 | 104.0 | 105.0 | 105.0 | 31.4 | 153.0 | 105.0 | 5.9 | 153.0 | 118.7 | |
| MEK DR to fail | 150 | 200 | 150 | >200 | 175 | >200 | 35 | 200 | 185 | 35 | 200 | >200 | |

(1) Double rubs with methyl ethyl ketone as solvent until more than 50% of the area of the paint film was destroyed
(2) Not measurable (inhomogeneous film)
(3) Not measurable (too soft)

It can be seen that for paint formulations 2.2, 2.4, 2.7, 2.8 and 2.11 where half of the ethylene urea-glyoxal resin was replaced by a conventional crosslinker, the presence of the crosslinker according to the invention led to a substantial increase in either König hardness or solvent resistance, or both, upon curing at ambient temperature (20° C.) or slightly elevated temperature (65° C.), compared to the sole use of these conventional crosslinkers at the same mass ratio of 70/30 for solid matter in the binder resin to solid matter in the crosslinker, where double rubs below 5 and König hardness of less than 15 s were found for ambient temperature (20° C.) crosslinking. All combinations with equal masses of crosslinker solids (2.2, and 2.4 through 2.12) were dust-dry after curing for 24 h at 20° C. A particularly favourable finding has been obtained for mixtures with crosslinker resins based on melamine formaldehyde resin crosslinkers (paints 2.1 through 2.3).

Example 3

Paint 3.1 was prepared in the same way as Paint 2.1 supra, but in this case, 21.1 g of butyl acetate, and 14.2 g of the butylated melamine formaldehyde resin crosslinker of example 2.1 were employed.

A further paint 3.2 was prepared in the same way as Paint 2.1, but in this case, 17.5 g of butyl acetate, 10.7 g of a crosslinker solution prepared in accordance with Example 1, but having a mass fraction of solids of 63%, and 7.1 g of the butylated melamine formaldehyde resin crosslinker solution of example 2.1 were employed. The ratio of the mass of the crosslinker resin of Example 1 to the mass of the butylated melamine formaldehyde resin was 1:1.

A further paint 3.3 was prepared in the same way as Paint 2.1, but in this case, 13.9 g of butyl acetate, and 21.4 g of the crosslinker solution as in paint 3.2, without addition of a further crosslinker, were employed.

All paints had a mass fraction of solid resins (crosslinkable hydroxyfunctional resin, and solid crosslinkers) of 45%. The following results were obtained, in dependence upon the curing conditions:

TABLE 2

Cured Paint Film Properties (Curing Conditions: temperature; time)

| | Paint | | |
|---|---|---|---|
| | 3.1 | 3.2 | 3.3 |
| 20° C.; 24 h | | | |
| Dry Film Thickness | | | |
| in mil (0.001 in) | 1.1 | 1.3 | 1.4 |
| im μm | 27.9 | 33.0 | 35.6 |
| König Hardness in s | 4 | 10 | 52 |
| MEK DR to fail (1) | 10 | 10 | 25 |
| 65° C.; 15 min | | | |
| Dry Film Thickness | | | |
| in mil (0.001 in) | 1.3 | 1.4 | 1.5 |
| im μm | 33.0 | 35.6 | 38.1 |
| König Hardness in s | 9 | 27 | 93 |
| MEK DR to fail | 10 | 25 | 75 |
| 120° C.; 20 min | | | |
| Dry Film Thickness | | | |
| in mil (0.001 in) | 1.3 | 1.3 | 1.3 |
| im μm | 33.0 | 33.0 | 33.0 |
| König Hardness in s | 151 | 156 | 156 |

In a further experiment, a steel sheet that had been coated with Paint 3.2 and cured at 65° C. for fifteen minutes was post-cured at 120° C. for twenty minutes. After the latter cure, the König hardness had increased from 27 s to 140 s, and the number of MEK double rubs was increased from 25 to 160.

A further unexpected finding was that the formaldehyde emission in mixed crosslinkers comprising melamine formaldehyde resin crosslinkers and a reaction product of a cyclic urea U and a multifunctional aliphatic aldehyde A according to the invention is markedly lower than calculated from the mere proportion of the formaldehyde based crosslinker present in the mixture. This finding can be used in crosslinking technology to formulate mixed crosslinkers comprising aminoplast resin crosslinkers that have both a lower propensity to liberate formaldehyde and the ability to be cured at lower temperatures in the range of from ambient (20° C.) to under 80° C., preferably up to 65° C. The lower propensity to liberate formaldehyde is illustrated by the following experiment:

Example 4

Formaldehyde Emission from Mixed Crosslinkers

Paints 4.1 through 4.5 were prepared from an alkyd resin (Beckosol® 12-035, as detailed supra), and crosslinker mixtures prepared from the reaction product of a ethylene urea and glyoxal of Example 1 and a butylated melamine formaldehyde resin crosslinker (CYMEL® MB-94 resin, mass fraction of solids: 96%) as used for the preparation of paints 2.1 through 2.3, with ratios of masses of solid matter in the melamine formaldehyde resin and the crosslinker resin of Example 1 of 30:0, 21:9, 15:15, 9:21 and 5:25. The ratio of mass of solids of alkyd binder resin to mass of solids of crosslinkers was 70:30 in all cases.

Paints 4.1 through 4.5 were prepared as follows: 14.2 g of butyl acetate, 0.9 g of methoxypropanol and 9.0 g of n-butanol were added to 52.5 g of the alkyd resin mentioned supra and mixed. 2.2 g of a 40% strength solution of para-toluene sulphonic acid in iso-propanol were then added and mixed into the diluted alkyd resin. Then, the crosslinker of Example 1 was admixed and stirred to homogenise the mixture, followed by the melamine formaldehyde resin crosslinker and a further homogenisation step.

The paints thus prepared were applied onto a 101.6 mm×304.8 mm (4"×12") iron-phosphated steel panel using a #65 wire-wound coating bar to drawdown the applied formulation resulting in a uniform film. The coated panels were then allowed to flash at room temperature for ten minutes. They were then allowed to cure at 130° C. for twenty minutes. Formaldehyde evolved during curing of the coating film was collected in a water trap and its mass was determined by ion chromatography following the method described in James E. McClure, "Determination of Parts-Per-Billion Levels of Formaldehyde in Aqueous Solution by Ion Chromatography with Post-Column Derivatisation", Analytical Letters 21(2), pages 253 to 263, 1988.

The formaldehyde release is given as the ratio w(FA) of the mass of formaldehyde collected in the trap divided by the mass of the cured film.

The following data were found, as visualised in FIG. 1:

TABLE 3

Formaldehyde Emission during Curing

| Paint No. | w(MF) in coating film solids in % | w(FA) in % | w(FA) theoretical in % |
|---|---|---|---|
| 4.1 | 5 | 0.12 | 0.32 |
| 4.2 | 9 | 0.29 | 0.58 |
| 4.3 | 15 | 0.65 | 0.97 |
| 4.4 | 21 | 1.18 | 1.35 |
| 4.5 | 30 | 1.93 | 1.93 | w(MF) stands for the mass fraction of MF resins present in the coating film, the maximum value of 30% is for onyl MF resin as crosslinker, and the reduced amounts are those where the rest up to a total of 30% is contributed by the crosslinker resins according to the invention
w(FA) is the mass fraction of formaldehyde measured (diamond-shaped data points in FIG. 1) which was split off during curing at 130° C. and twenty minutes, based on the mass of the cured film
w(FA) theoretical (straight line and square data points in FIG. 1) is the mass fraction of formaldehyde split off as calculated from the amount of melamine formaldehyde resin present in the coating composition

The invention claimed is:

1. A crosslinker composition comprising
   (a) a reaction product of a cyclic urea U and a multifunctional aldehyde A, wherein the cyclic urea U is not hydroxy functional, and
   (b) at least one crosslinker selected from the group consisting of
      (b1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1,
      (b2) reaction products of urea and/or cyclic ureas and formaldehyde,
      (b3) alkoxycarbonylaminotriazines,
      (b4) multifunctional isocyanates which may be partially or completely blocked,
      (b5) reaction products of phenols and aliphatic monoaldehydes,
      (b6) multifunctional epoxides,
      (b7) multifunctional aziridines,
      (b8) multifunctional carbodiimides,
   wherein any of the crosslinkers (a) and (b) which have hydroxyl groups may be etherified with one or more linear, branched, or cyclic aliphatic alcohols.

2. The crosslinker composition of claim 1 comprising
   (a) a reaction product of a cyclic urea U and a multifunctional aldehyde A, and
   (b) at least two crosslinkers selected from the group consisting of
      (b1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1,
      (b2) reaction products of urea and/or cyclic ureas and formaldehyde,
      (b3) alkoxycarbonylaminotriazines.

3. The crosslinker composition of claim 1 wherein U is selected from the group consisting of ethylene urea, 1,2- and 1,3-propylene urea, butylene urea, and glycoluril.

4. A crosslinkable composition comprising a crosslinker composition as claimed in claim 1, and an oligomeric or polymeric material having reactive functional groups selected from the group consisting of hydroxyl groups, carboxyl groups, mercaptan groups, phosphine groups, amide groups, imide groups, carbamate groups, imino groups and amino groups.

5. The crosslinkable composition of claim 4 wherein the functional groups are hydroxyl groups, and the oligomeric or polymeric material is selected from the group consisting of acrylic resins, polyester resins, alkyd resins, polyurethane resins, epoxy resins, vinyl resins, polyether polyols, characterised in that the oligomeric or polymeric material has a hydroxyl number of from 5 mg/g to 300 mg/g.

6. The crosslinkable composition of claim 4 wherein the functional groups are carboxyl groups, and the oligomeric or polymeric material is selected from the group consisting of acrylic resins, polyester resins, alkyd resins, polyurethane resins, epoxy ester resins, vinyl resins, rosin, and maleinate resins, characterised in that the oligomeric or polymeric material has an acid number of from 5 mg/g to 300 mg/g.

7. The crosslinkable composition of claim 4 wherein the functional groups are amino groups, and the oligomeric or polymeric material is selected from the group consisting of acrylic resins, polyurethane resins, epoxy amine adducts, and vinyl resins, characterised in that the polymeric material has an amine number of from 5 mg/g to 300 mg/g.

8. The crosslinkable composition of claim 4 wherein the functional groups are carbamate functional groups, and the oligomeric or polymeric material is selected from the group consisting of acrylic resins, polyurethane resins, epoxy amine adducts, and vinyl resins, characterised in that the oligomeric or polymeric material has a specific amount of substance of carbamate groups of from 0.1 mmol/g to 6 mmol/g.

9. The crosslinkable composition of claim 4 wherein the oligomeric or polymeric material is present as an aqueous dispersion.

10. The crosslinkable composition of claim 4 wherein the oligomeric or polymeric material is present as a solution in a non-aqueous solvent.

11. The crosslinkable composition of claim 4 wherein the oligomeric or polymeric material is present as a particulate solid having a melting temperature in excess of 35° C.

12. The crosslinker composition of claim 1 wherein the activation temperature of crosslinker (a) and the activation temperature of crosslinker (b) differ by at least 10 K, where the activation temperature of crosslinker (a) is lower than the activation temperature of crosslinker (b).

13. A method of use of the crosslinker composition of claim 12 to coat a substrate, comprising
   i) mixing a crosslinker composition comprising
      (a) a reaction product of a cyclic urea U and a multifunctional aldehyde A, wherein the cyclic urea U is not hydroxy functional, and
      (b) at least one crosslinker selected from the group consisting of
         (b1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1,
         (b2) reaction products of urea and/or cyclic ureas and formaldehyde,
         (b3) alkoxycarbonylaminotriazines,
         (b4) multifunctional isocyanates which may be partially or completely blocked,
         (b5) reaction products of phenols and aliphatic monoaldehydes,
         (b6) multifunctional epoxides,
         (b7) multifunctional aziridines,
         (b8) multifunctional carbodiimides,
      wherein any of the crosslinkers (a) and (b) which have hydroxyl groups may be etherified with one or more linear, branched, or cyclic aliphatic alcohols,
         and at least one oligomeric or polymeric material having reactive functional groups selected from the group consisting of hydroxyl groups, acid groups, amino groups, imino groups, amide groups, imide groups, mercaptan groups, phosphine groups, and carbamate groups, to form a crosslinkable mixture,
   ii) applying the said crosslinkable mixture to a substrate to form a coated substrate having at least one layer on at least one surface of the said substrate,
   iii) subjecting the coated substrate to a temperature which is at least as high as the activation temperature of the crosslinker (a), but lower than the activation temperature of the crosslinker (b),
   iv) optionally repeating steps i) to iii)
   v) subjecting the coated substrate to a temperature which is at least as high as the activation temperature of the crosslinker (b).

14. The method of use of claim 13, characterised in that the substrate is selected from the group consisting of paper, cardboard, textiles, leather, wood, fabricated wood, and also plastics including composite materials, thermoplastics, and thermosets, and also from metals, ceramics, stone, plaster, glass, and concrete.

15. A method of lowering the formaldehyde emission during curing of a crosslinkable composition of claim 4 comprising mixing
   (a) a reaction product of a cyclic urea U and a multifunctional aliphatic aldehyde A, wherein the cyclic urea U is not hydroxy functional,
   (b) at least one crosslinker selected from the group consisting of
      (b1) reaction products of an aminotriazine and formaldehyde,
      (b2) reaction products of urea and/or cyclic ureas and formaldehyde, and
      (b5) reaction products of phenols and formaldehyde, to form a mixed crosslinker, and admixing the said mixed crosslinker to at least one of oligomeric or polymeric materials having reactive functional groups selected from the group consisting of hydroxyl groups, carboxyl groups, mercaptan groups, phosphine groups, amide groups, imide groups, carbamate groups, imino groups and amino groups.

16. A method of use of crosslinker composition of claim 1 as crosslinker for substrates selected from the group consisting of paper, textiles, wood, fabricated wood, leather, or cellulosic materials, comprising mixing at least one of catalysts, fillers, wetting agents, solvents, and diluents, to the crosslinker composition of claim 1 and applying the mixture thus formed to the substrate.

* * * * *